United States Patent Office 2,791,380
Patented May 7, 1957

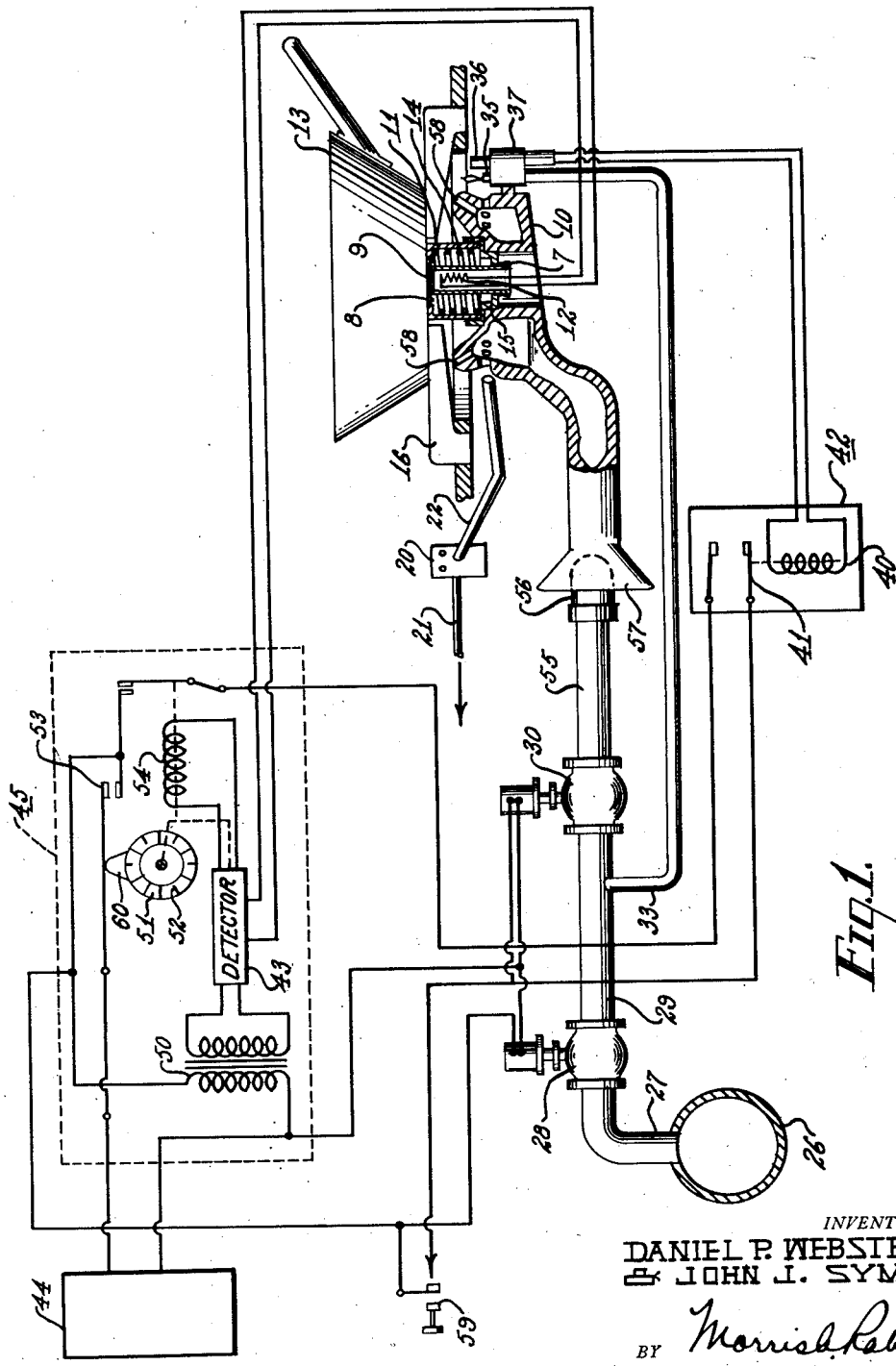

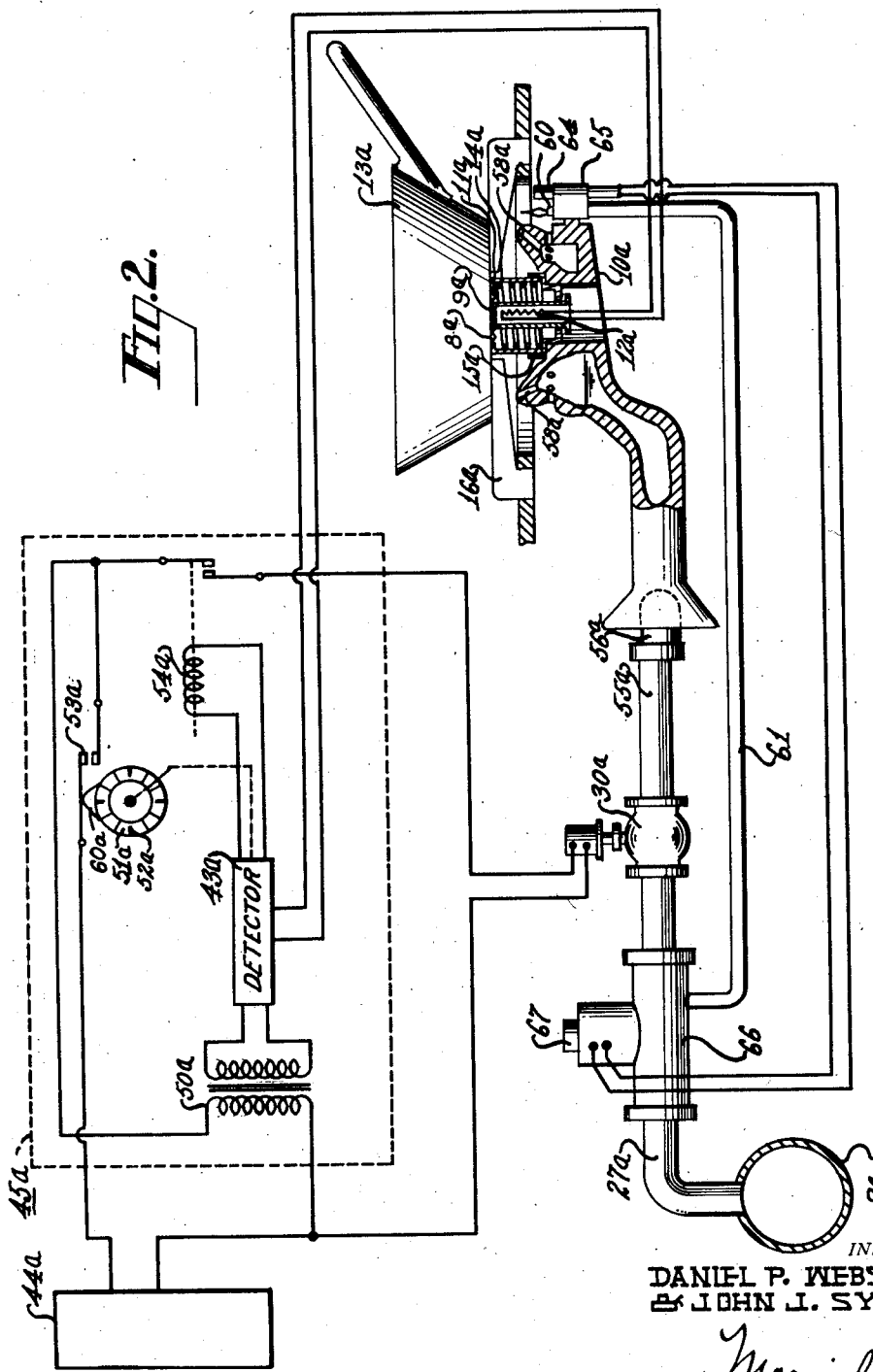

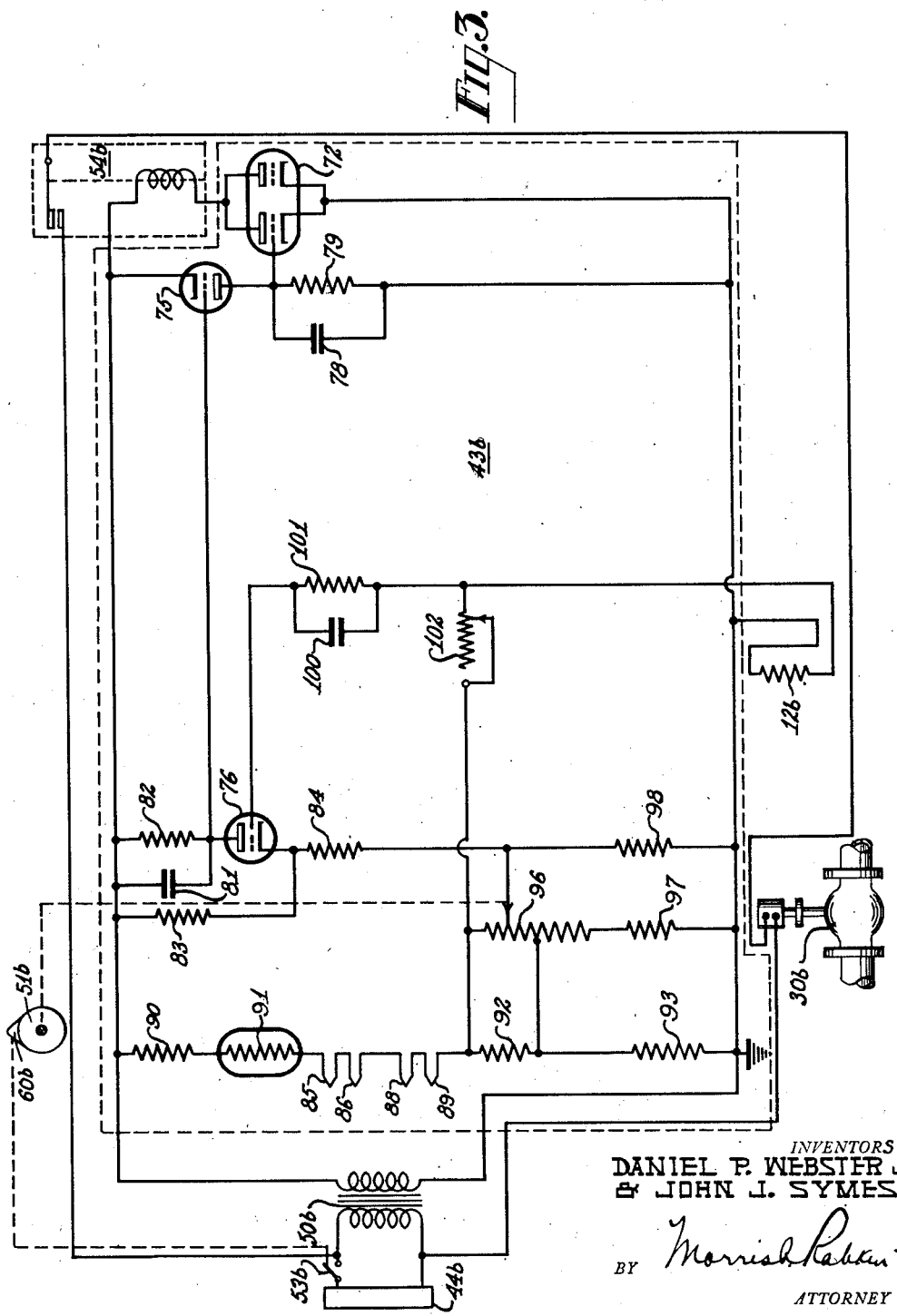

2,791,380

GAS SURFACE BURNER CONTROL

John J. Symes, Haddonfield, and Daniel P. Webster, Jr., Camden, N. J., assignors, by mesne assignments, to Whirlpool-Seeger Corporation, a corporation of Delaware Application December 4, 1953, Serial No. 396,111

3 Claims. (Cl. 236—21)

This invention relates to control systems for gas ranges and more particularly to automatic temperature control systems for gas range surface burners.

Manual control of a surface cooking element or surface burner on a gas range involves wasteful trial and correction after errors become obvious. An experienced cook can recognize at a comparatively early stage that the cooking rate is either too fast or too slow. It is improbable that even the most experienced cook can set the combustion rate to completely carry through a cooking operation without readjustment. During the cooking process, the character and state of the food materially changes. Where water is continuously evaporated from a mixture, only diligent surveillance will prevent overheating. Casserole dishes must be maintained within close limits at an extremely high temperature level without being allowed to scorch or burn. Deep fat frying is a hazardous operation on a manually controlled surface burner. The burner flame must be vigilantly tended to prevent a sudden rise in temperature which might scorch or burn the food being fried. This invention reliably maintains a preselected utensil temperature. It enables even an inexperienced cook to safely perform high temperature frying and baking and the full range of ordinary cooking operations on the surface burner of a gas range.

The principal object of this invention is to provide an automatic temperature control for a surface burner of a gas range which reliably maintains a cooking utensil within close limits at a preselected temperature.

Another object is to provide a temperature control system for a surface burner of a gas range which can be set to maintain a preselected temperature over the entire cooking range including warming, boiling, and frying.

A further object is to provide a control system of the aforementioned type which can maintain temperature within close enough limits to perform high temperature operations on the surface burner of a gas range without the slightest danger of scorching or burning.

Still another object is to provide a system of the aforementioned type which will be free from leakage of unburned gas.

Still a further object is to provide an inexpensive automatic temperature control system for the surface burner of a gas range which utilizes a temperature sensitive resistor or thermistor to actuate an electrically operable gas valve.

A preferred system for regulating the supply of gas to the surface burner of a gas range includes a temperature sensitive resistor or thermistor, a voltage detector circuit, and a solenoid operated gas valve. The resistance of the thermistor decreases appreciably as its temperature increases. The thermistor is mounted within the open center of a gas burner and extends through the burner grate to firmly contact the bottom of a cooking utensil. The thermistor is electrically connected in the grid circuit of a triode. A manually variable resistor or potentiometer negatively biases the cathode of this triode. The voltage drop across the thermistor opposes the negative cathode bias on the triode. Current flow through the triode after amplification energizes a relay which opens a solenoid operated gas valve. The voltage drop across the thermistor is governed by the temperature of the thermistor. The potentiometer controls the cathode voltage of the triode. Its setting corresponds to the preselected burner temperature. When the temperature of the thermistor is equal to this preselected temperature, the triode stops conducting or is cut off. When the temperature of the thermistor rises above the preselected temperature, the current through the triode remains cut off. The gas valve is therefore opened or closed in response to a variation in temperature of the utensil below or above the preselected temperature. A pilot burner reignites the burner on a resumption of gas flow.

Other objects and advantages of the present invention will, of course, become apparent and immediately suggest themselves to those skilled in the art to which the invention is directed from a reading of the following specification in connection with the accompanying drawing in which:

Fig. 1 is a schematic diagram of the control system as applied to a gas burner which is shown in a cross-sectional view in elevation;

Fig. 2 is a schematic diagram of a control system similar to that shown in Fig. 1 utilizing a continuously burning pilot; and Fig. 3 is a more detailed schematic diagram of the electrical portion of the control system employed with the apparatus of either Fig. 1 or Fig. 2.

In Fig. 1, a control system is shown connected to regulate the temperature of a surface gas burner 10. A thermistor 12 is supported within a housing 11 which is mounted in the center of the gas burner. The thermistor is encased in heat exchange relationship within the contact cylinder 9. The contact cylinder is mounted within the housing 11 by the flexible insulating washer 8. This cylinder 9 is pressed along with housing 11 by the spring 14 bearing against the insulated mounting cup 15, to contact the bottom of a cooking utensil 13 supported on the burner grate 16. A lip 7 on the cylinder lower edge prevents the cylinder and housing from being totally ejected from the mounting cup 15 by the spring 14 when the utensil is removed. A main stove pilot 20 connected to the gas supply through tube 21 has an ignition tube 22 leading to the gas burner. The gas supply manifold 26 is connected through conduit or pipe 27 to the electrically operable valve 28. The electrically operable valve, for example, may be of the solenoid operated globe type. From this first electrically operable valve 28 which controls supply of gas to the entire unit, another pipe 29 leads to another electrically operable valve 30. A smaller pipe 33 joins pipe 29 at a point between the two electrically operable valves. This pipe supplies gas to another auxiliary pilot 35 which is mounted close to the gas burner 10. A thermo-pilot generator 36 is held close to the flame of the pilot 35 by the bracket 37. The thermopilot generator is connected electrically to the solenoid 40 which together with contacts 41 comprises the relay 42.

The control system 45 includes: control dial 51 having temperature indicating markings 52, contacts 53 which are held open when the dial is set at the "off" position, voltage detector 43, and relay 54 connected to and operated by the detector 43.

The voltage detector 43 of the control system 45 is connected to the thermistor 12. A schematic diagram of the detector is shown in Fig. 3. A source of potential 44 supplies 110 volt A. C. to open the valves 28 and 30. The source is coupled through transformer 50 to the detector circuit 43. In an actual range, dial 51 is mounted on the upper front panel or backguard panel for convenient manipulation during cooking. Marks or indicia 52 on the face of the dial indicate various temperature related cooking conditions such as warming, boiling and frying. These zones are further subdivided for the convenience of the operator into low, high, and medium zones.

The electricially operated valve 30 controls the flow of gas into the pipe 55 leading to the burner air mixing chamber 56. This air mixing chamber leads within the venturi 57 of the burner 10. A push button 59 is connected to open the electrically operated valve 30 by connecting it directly to the 110 volt A. C. source 44.

The control unit operates as follows. When the dial 51 is turned to a preselected temperature, contacts 53 are closed by cam 60 coupled to dial 51 to supply current from the 110 volt A. C. source to the valve 28. The current opens the valve to supply gas to the pipe 29. Gas is supplied to the pilot 35 through the pipe 33 leading from pipe 29. When the cook closes the push button contacts 59, current is supplied to the other electrically operated valve 30 permitting gas to flow through the pipe 55 through the mixing chamber 56 into the venturi 57 and out of the ports 58 of the gas burner 10. Some of the gas flowing through the burner passes through the ignition tube 22 to the continuously burning main stove pilot 20. It flashes back from the pilot to ignite the gas flowing from the burner 10.

The burning gas flowing from the burner 10 ignites the auxiliary pilot 35. The control system is operative to keep the valve 30 open to continue to supply gas to the burner as long as relay 42 is closed. The relay is held closed as long as the pilot 35 burns. The pilot 35 will continue to burn being supplied gas through the valve 28 as long as the dial is turned from the "off" position. When the thermo-pilot generator 36 builds up a voltage sufficient to close the contacts 41 of the relay 42, the valve operating system is maintained connected to the source of voltage.

If the thermistor temperature falls below the preselected dial temperature setting, its relatively high resistance at this low temperature develops a voltage drop sufficient to overcome the negative bias on the detector circuit. An amplified signal is developed by the detector which closes the relay 54 to supply current to the electrically operated valve 30. Valve 30 opens to supply gas through the connecting pipe 55 to the burner 9. The resumed flow of gas through the burner will be ignited by the pilot 35.

The cooking utensil 13 on the grate 16 will be therefore heated by the burner. The thermistor cylinder 9 is pressed in close heat exchanging contact with the bottom of the utensil being heated in the flame zone of the burner. When the temperature of the thermistor rises, its resistance decreases. The voltage drop acting across it drops below the threshold voltage required to bias on the detector circuit. The detector output signal cuts off to deenergize the relay 54. The relay contacts open cutting the valve off from the source of potential 44 to close the valve 30. Burner 10 is extinguished when its gas supply is cut off. The pilot 35 continues to burn from gas supplied through the valve 28 to be ready to reignite the burner on a resumption of gas flow.

The valve 30, therefore, turns the burner off when the utensil rises a predetermined amount above the preselected temperature and turns it on when the utensil temperature, as sensed by the thermistor, drops a predetermined amount below the preselected temperature. This temperature regulation will continue as long as the dial is turned from the "off" position to maintain the valve 28 opened.

In Fig. 2 the same reference characters are used for the same parts as were shown in Fig. 1 with the addition of the suffix "a." The auxiliary pilot arrangement for reigniting the burner shown in Fig. 1, utilizing the relay operated by the thermo-pilot generator, is replaced by a continuously burning pilot 60. The electrically operated valve 28 is eliminated as is also the push button 59.

As shown in Fig. 2, a continuously burning pilot 60 is steadily supplied with gas through safety shut-off valve 66 from the gas supply manifold 26a. The pilot is supplied by the pipe 61 controlled by valve 66. This pipe is connected to the pilot 60 which burns continuously near the ports of the burner 10a. A thermocouple element 64 is supported by the bracket 65 to the flame of the pilot 60.

This element 64 controls the safety shut-off valve 66 installed in the supply pipe 27a leading from the manifold 26a. Should the pilot be extinguished, the safety shut-off valve 66 will close to prevent unburned gas from flowing out of the burner 10a or pilot 60.

The thermocouple element 64 is coupled by the bracket 65 to be heated by the flame of pilot 60. The thermocouple element 64 will allow the solenoid latched shut-off valve 66 to close as the pilot goes out. No dangerous amount of unburned gas can therefore flow out of the burner or pilot. The safety valve is reset by relighting the pilot to reheat the element 64 while holding the "Reset" button 67 for about 30 seconds. The control system operates in all other respects similarly to the device shown in Fig. 1.

When the valve 30a is opened or closed in response to actuation by the sensing thermistor and voltage detector circuit, the pilot 60 is therefore, ready to reignite the burner when the supply of gas resumes its flow from the burner ports. The ignition tube or flash-back pilot may allow the flow of a considerable amount of unburned gas. Rapid on-off operation of the burner under temperature control may liberate a prohibitive amount of unburned gas. The continuous burning pilot effectively prevents the escape of unburned gas.

In Fig. 3 is shown a schematic diagram including the voltage detector circuit 43b″ designated in Fig. 1 and Fig. 2 by the reference characters 43 and 43a. Parts shown in Fig. 3 identical with parts shown in Figs. 1 and 2 are designated by the same reference character followed by the suffix "b." A source of 110 volt A. C. 44b is connected across the electrically operated valve 30b through the relay 54b. The relay 54b is energized through the plate circuit of the amplifying dual triode 72. The switch 53b operated by the cam 60b on the temperature selection dial 51 (not shown), is connected in one line from the source 44b to cut off the power supply when the dial is in the "off" position. The power source is coupled to the control circuit by the isolation transformer 50b. The isolation transformer 50b may supply approximately 110 volts in its secondary to the control circuit.

The grid of dual triode 72 is connected to the plate circuit of triode 75. The grid of 75 is connected in turn to the plate circuit of triode 76. A parallel network is connected in the plate circuit of triode 75 to act as a plate load resistor. The network is made up of the capacitor 78 and resistor 79. Another plate load resistor network is connected in the plate circuit of triode 76. This network is made up of capacitor 81 and resistor 82. Resistors 83, 84 and 98 are connected to bias the cathode circuit of triode 76. The cathode heaters 86 of triode 76, 85 of triode 75 and cathode heaters 88 and 89 of triode 72 are connected in series with resistors 90, 92 and 93 and current limiting ballast tube 91. This line of series components is connected as a voltage divider across secondary of the isolation transformer. Potentiometer 96 and resistor 97 are connected across resistors 92 and 93. The variable tap on the potentiometer 96 is connected to the cathode of the detector triode 76 through the cathode bias resistor 84. The potentiometer is thereby connected to the output circuit of the detector. The thermistor is connected to the grid of triode 76 through a grid leak bias network, made up of capacitor 100 and resistor 101. The center tap of potentiometer 96 is connected to the voltage divider at the junction of resistors 92 and 93. The movable tap of potentiometer 96 is connected to and operated by the dial 51b.

The detector circuit energizes the relay 54b when the temperature of the thermistor 12b drops below the preselected temperature, and it deenergizes the relay 54b when the temperature of the thermistor rises above the preselected temperature. When the relay is energized, current is supplied to open the valve 30b to allow gas to flow through the burner. When the relay 54b is deenergized, the valve 30b closes cutting off the supply of gas and heat. Operation of the relay 54b depends upon whether current flows through the detector triode 76.

The preselected temperature is set by manipulating the temperature control dial (not shown) which also closes switch 53b. Moving the dial adjusts the position of the variable tap on the potentiometer 96. This varies the cathode bias of triode 76. When the temperature of the thermistor is below the preselected temperature, its increased resistance will develop a voltage drop in the grid circuit of detecting triode 76 sufficient to overcome the negative cathode bias. Current starts to flow in the detecting triode. This flow of current develops an amplified voltage in triode 75. The voltage is further amplified in dual triode 72. The amplified voltage energizes relay 54b which closes to provide current to electrically operated valve 30b. The valve opens to supply gas to the burner.

When the temperature of the thermistor rises above the preselected temperature, its resistance decreases. A voltage sufficient to overcome the negative cathode bias of detecting triode 76 is no longer developed across the thermistor. Triode 76 cuts off to deenergize relay 54b. On being cut off from the voltage supply, the solenoid operated valve 30b closes to shut off the supply of gas to the burner.

The variable resistor 102 is included to compensate for system variables. It may be adjusted to make the detector cut off at the preselected cooking temperature set on the dial.

What is claimed is:

1. A gas range surface burner control comprising a conduit for supplying gas to said burner, an electrically operable valve in said conduit for interrupting the supply of gas to said burner, an electrically operable switch, a source of current connected to said electrically operable valve through said electrically operable switch, a temperature sensitive resistor for disposition in heat exchange relationship with a utensil being heated by said burner, the electrical resistance of said temperature sensitive resistor varying with a change in its temperature, a vacuum tube including a control grid, a cathode and a plate, said resistor being connected to said control grid of said vacuum tube, a potentiometer connected to negatively bias said cathode of said vacuum tube, said potentiometer including means for being adjusted to a predetermined resistance in accordance with a preselected temperature at which said utensil is to be maintained, an amplifier, said vacuum tube plate being connected to provide a signal to said electrically operable switch through said amplifier, and said vacuum tube including means for operating said switch when the temperature of said utensil varies past said preselected temperature.

2. A gas range surface burner control comprising a conduit for supplying gas to said burner, a first electrically operable valve installed in said conduit for interrupting the supply of gas to said burner, a second electrically operable valve being connected in said conduit to control the supply of gas to said first electrically operable valve, a pilot burner disposed in igniting relationship to said surface burner, a thermoelectric generator disposed in heat exchange relationship with said pilot burner, said thermoelectric generator being electrically connected to said second electrically operable valve to close said valve when said pilot burner is extinguished, a temperature sensitive resistor for disposition in heat exchange relationship with a utensil being heated by said burner, the electrical resistance of said temperature sensitive resistor varying with a change in its temperature, an electrically operable switch, a source of electrical current being connected to said first electrically operable valve through said electrically operable switch, a voltage detector, said detector being connected to said temperature sensitive resistor and to said electrically operable switch, and said detector including means for operating said switch in response to a signal from said temperature sensitive resistor.

3. A gas range surface burner control comprising a conduit for supplying gas to said burner, an electrically operable valve in said conduit for interrupting the supply of gas to said burner, an electrically operable switch, a source of current being connected to said electrically operable valve through said electrically operable switch, a thermistor for disposition in heat exchange relationship with a utensil being heated by said burner, a vacuum tube including a control grid, a cathode and a plate, said thermistor being connected to said control grid of said vacuum tube, a potentiometer connected to negatively bias the cathode of said vacuum tube, said potentiometer including means for biasing said vacuum tube to cut off when said cooking utensil and said thermistor are below a preselected temperature, an amplifier, the plate of said vacuum tube being connected to said electrically operable switch through said amplifier to provide a signal for closing said switch and for opening said valve when the temperature of said cooking utensil and said thermistor fall below said preselected temperature.

References Cited in the file of this patent

UNITED STATES PATENTS

| 2,187,834 | Mantz | Jan. 23, 1940 |
|---|---|---|
| 2,312,479 | Ray | Mar. 2, 1943 |
| 2,366,501 | Gille | Jan. 2, 1945 |
| 2,423,541 | Wilson | July 8, 1947 |
| 2,444,733 | Gille | July 6, 1948 |
| 2,534,097 | Akeley | Dec. 12, 1950 |
| 2,575,078 | Strobel | Nov. 13, 1951 |
| 2,686,250 | Schroder | Aug. 10, 1954 |